United States Patent [15] 3,702,900
Stürzinger [45] Nov. 14, 1972

[54] SYNCHRONIZING DEVICES

[72] Inventor: Oskar Stürzinger, Baar, Zug, Switzerland

[73] Assignee: Anstalt Europaische Handelsgesellschaft, Vaduz, Liechtenstein

[22] Filed: Aug. 24, 1970

[21] Appl. No.: 66,341

[30] Foreign Application Priority Data

Aug. 29, 1969 Switzerland.............13161/69

[52] U.S. Cl...............................178/53.1, 179/15 AF
[51] Int. Cl...............................................H04l 7/04
[58] Field of Search............178/50, 53.1; 179/15 AF

[56] References Cited

UNITED STATES PATENTS

| | | | |
|---|---|---|---|
| 3,575,557 | 4/1971 | McCowen | 178/50 |
| 3,310,626 | 3/1967 | Cassidy | 178/50 |
| 3,337,687 | 8/1967 | Normand | 178/50 |
| 3,387,086 | 6/1968 | Beresin | 178/50 |

*Primary Examiner*—Kathleen H. Claffy
*Assistant Examiner*—David L. Stewart
*Attorney*—Ostrolenk, Faber, Gerb & Soffen

[57] ABSTRACT

This invention relates to synchronizing devices for telegraphy systems for processing binary coded signals having a start and stop signal element. According to the invention, a storage unit is provided at the transmitter for temporarily storing signal groups and this is connected to a signal transmitter to produce signal groups coded to the information to be transferred or transmitted: the signal transmitter is connected to a transmitter distributor that interrogates the storage unit at constant frequency and the transmitter distributor also has an empty storage unit to produce a filler signal group containing no information and used for shortening the stop step of each signal group; at the receiver means are provided that respond at the constant time frequency to control the operational frequency of the receiver.

3 Claims, 2 Drawing Figures

Figure 1:
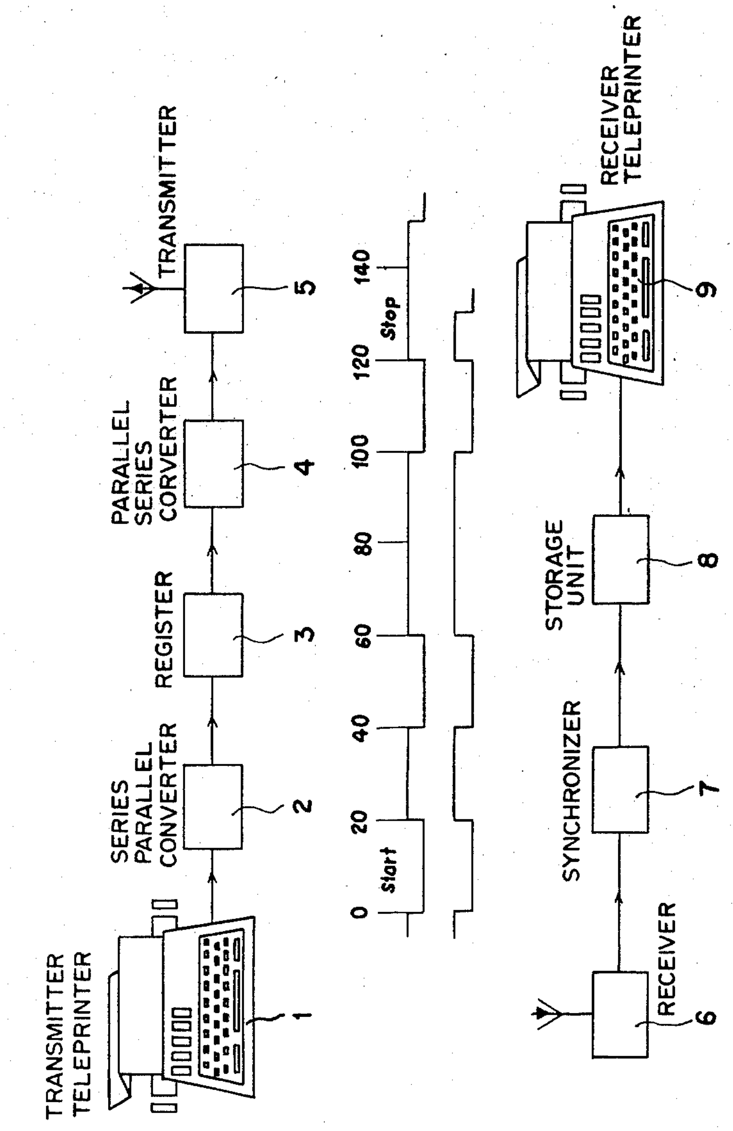

INVENTOR.
OSKAR STÜRZINGER
BY
Ostrolenk, Faber, Gerb & Soffen
ATTORNEYS

PATENTED NOV 14 1972 3,702,900

INVENTOR.
OSKAR STURZINGER
BY
Ostrolenk, Faber, Gerb & Soffen
ATTORNEYS

SYNCHRONIZING DEVICES

The present invention relates to a synchronizing device for telegraphy systems, more particularly wireless telegraphy systems, which process binary coded signals having a start and stop signal element.

The huge expansion in the use of telegraphy as a convenient means of communication, has called for developments which allow this latter also to be used on wireless transmission channels.

In commercial systems, in which cost is relatively unimportant, a transmission quality is obtained with code converters and error correction systems which hardly differ from wire-connected transmission channels.

In small installations and more particularly mobile telegraphy systems, cost assumes a greater importance and garbled or comparatively unintelligible reception such as is usual in start/stop telegraphy in some circumstances, due to interference and fading, can, by and large, be tolerated. Mostly, the communications transmitted are repeated and the results are compared in order to reconstruct the contents of the communication or message as well as possible.

When transmitting data, it is, however, important to guarantee at least the number of characters sent under the circumstances, certain garbled messages being tolerable by means of logical coding provided that it is guaranteed that no characters will be added during transmission (for example by interference pulses which are evaluated as start signal elements (or are suppressed), e.g., by fading).

In such cases, the systems are adapted to so-called synchronous operation in which the receiver is equipped with an additional device which continuously measures the clock frequency of the distant transmitter operated mostly by a punched tape, at a constant mostly the maximum speed and stores it like a fly-wheel or pendulum. When the input signals to the wireless receiver cease, start and stop pulses derived from the fixed and stored clock frequency are emitted by the teleprinter at the receiver, until radio contact is produced again. (e.g., German specification No. 1,066,609).

The receiving teleprinter will type out meaningless characters during these transition times until the input signals are again presented to the radio receiver and can be fed in phase to the teleprinter.

In the present, usual, reputable stable teleprinter motors such synchronizing apparatus can bridge radio silences or interference for several minutes. They are mostly electronic and extremely stable in their once chosen clock frequency, so that the divergence of the synchronizers and the distant transmitting teleprinter are mostly dependent on the quality of the latter.

In reciprocal communications, however, it has often prooved to be a hindrance if the text may only be read off from punched tape, since a manual, key-controlled transmission cannot necessarily keep up with the complete maximum possible transmission rate.

It is an object of the present invention to avoid this disadvantage by rendering possible reciprocal operational communications as in wire-connected telegraphy networks, with guaranteed synchronous transmission, over radio paths by means of commercially conventional start/stop telegraphy. To this end, a synchronizing device of the aforementioned type is proposed which is characterized according to the invention in that on the transmission side a storage unit for temporarily storing these signal groups is connected to a signal transmitter for producing signal groups coded according to the information to be transmitted, which signal transmitter is connected to a transmitting distributor interrogating the storage unit having a constant clock frequency, the transmitting distributor being additionally equipped to produce with an empty storage unit, a group of filler signals, meaningless as regards information and to shorten the stop signal of each signal group, and, on the receiver side, means are provided responding to the constant clock frequency which control the operating frequency of the receiver.

Figure 2:
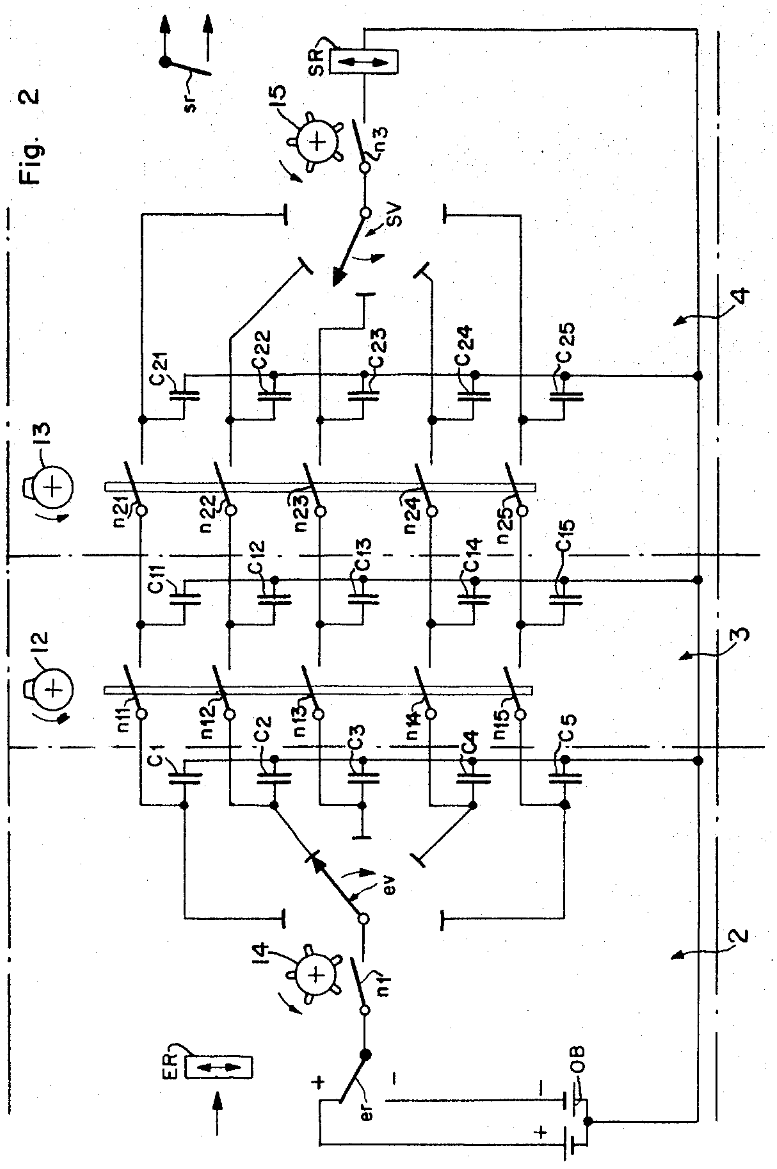

In order that the invention may be more clearly understood, reference will now be made to the accompanying drawings which show one embodiment thereof purely by way of example, and in which:

FIG. 1 shows a block diagram, of a telegraphy system, which will explain the method of operation of the synchronizing device of the invention, and FIG. 2 shows a simplified circuit configuration for certain stages illustrated in FIG. 1.

Referring now to the drawings, a conventional start/stop teleprinter is shown at 1, which transmits pulses to a storage unit. This latter is fitted with a receiver distributor or so-called series/parallel converter. It stores the group of signals emanating from the teleprinter, i.e., the five-characteristic pulses appearing in CCITT-code No. 2, in parallel. A transmitter-distributor or parallel/series converter is shown at 4 which transmits to a radio transmitter 5, e.g., according to CCITT-code No. 2 a start pulse, the five signals pulses and a stop pulse. The latter is shortened by means of the transmitter-distributor 4 to a length of approximately 18 ms. A letter pulse train therefore amounts to only 6.9 instead of 7 and 7.4, steps as is usual in other cases. As long as nothing is sent out from the teleprinter, the transmitting distributor 4 will only transfer the shortened stop step, i.e., the CCITT-combination No. 32. As soon as a character from the teleprinter 1 comes in, this latter is stored in the storage unit 2 and transferred to a register 3 at a favorable phase time, from which it is re-transferred into the register of the transmitter-distributor 4, again at a favorable phase time, which re-transmits the character to the radio transmitter 5.

Since the transmitter distributor 4 is operating with a decreased total length of the signal group due to shortening of the stop gap, it will be able to process all the resultant signal groups also in the case where the teleprinter is being operated at maximum speed (according to present-day standards 7.4 steps per character or, according to an earlier standard, at 7 steps per character).

A train of characters appears at the transmitter 5 which exist in the typing pauses of the teleprinter 1 of the CCITT-combination No. 32 or otherwise of the signals arising from the teleprinter 1.

The characters appear at the radio receiver 6 and control a synchronizer 7 which therefore balances out the typing rate of 6.9 pulses of the remote transmitting distributor 4. Since both this transmitter 4 and also the receiver synchronizer 7 represent structures independent of the teleprinter, they can be constructed as highly stable systems which can therefore bridge a very great area or fading period of the radio pulse.

The synchronizer 7 transmits the signals in parallel form to a storage unit of a local transmitter distributor 8 which it passes on in usual manner again in series to a receiver teleprinter 9.

Since in radio transmission as a rule no pulse distortions occur which significantly influence the receiver capability, this teleprinter will be able to process these characters without trouble, even with shortened stop pulses.

The intermediate storage of the signals in the synchronizer 17 or transmitter distributor 7 has, however, the purpose of passing on all characters to the receiver teleprinters 9 with exception of CCITT No. 32 since the latter were introduced at the transmitter only from the transmitting distributor 4 as filler signals for the operational pauses of the teleprinter 1.

If the radio transmission is distorted, possibly giving rise to the danger hat a type character can arise as combination No. 32, due to garble, it is advantageous for it to be possible to pass on in general *all characters* to the receiver teleprinter 9, i.e., to remove the blocking effect of the transmitter distributor 8. Since this combination according to CCITT Code No. 32 is not associated with any kind of function acquired in any way, in this case only somewhat increased wear on the teleprinter mechanism occurs which, however, as a rule should be insignificant.

A circuit of one embodiment of some of the individual stages provided in FIG. 1 will be explained in more detail diagrammatically with the aid of FIG. 2. To the left of FIG. 2 in the area enclosed by the dotted-line, is shown the storage unit having the receiver distributor and shown at 2 in FIG. 1, the register 3 is shown in the center, and to the right is shown the transmitter distributor 4. The teleprinter is connected in a usual manner to a receiver relay ER whose contacts *ER* are each connected according to signal polarity to the plus- or minus-pole of an internal battery OB. In the pulse center a contact $n_1$ temporarily closes the arm of the receiver distributor *ev* connects in phase and successively one electrode of capacitors $C_1$, $C_2$ . . . $C_5$ to this contact so that parallel storage of the corresponding information takes place in the five capacitors $C_1 - C_5$, whose other electrode is on the central pole of the internal voltage source OB.

In the stop and start period of the signal group which emanate from the teleprinter 1, the contacts $n_{11}$ . . . $n_{15}$ are simultaneously actuated by means of a synchronous cam 12 shown to the left of FIG. 2 so that the stored information is transferred into capacitors $C_{11}$, $C_{12}$ . . . $C_{15}$.

A transmitter distributor *sv* is connected in conventional manner to a relay SR and removes the information from the storage capacitors $C_{21}$, $C_{22}$ / $C_{25}$, by successively scanning the latter. Information is transferred at a regular rate by means of the contact $n_3$ to the transmitting relay SR. The information from these capacitors is again transferred at an advantageous phase time of the transmitting distributor through the contacts $n_{21}$, $n_{22}$ . . . $n_{25}$ from the storage unit 3. A counter-lock (not shown) for the contact control $n_{11}$ . . . $n_{15}$ or $n_{21}$ . . . $n_{25}$, limits the cam plates 14 and 15 shown respectively to the left and to the right so that the transfer of the information from the storage unit 2 via the register 3, to the transmitter distributor 4 takes place at unfavorable times so that advantageously intermediate storage always takes place in the register 3.

An analogue circuit is possible at the receiver which, however, is simplified in the majority of cases, because no intermediate store is necessary since the receiving teleprinter adapts itself to the speed of the synchronous running synchronizer distributor 7 which itself advantageously controls the transmitting distributor 8. It is even possible generally to omit a storage unit in the receiver and to transfer information directly from a synchronizer 7 to the teleprinter.

What I claim is:

1. In a teleprinter communication link, comprising a single transmitting teleprinter apparatus for producing coded signals in a code including a start and a stop bit and a plurality of data bits, a single receiving teleprinter apparatus for receiving said coded signals and a single transmission channel connecting said single transmitting teleprinter to said single receiving teleprinter which operates substantially in synchronism with the information introduced into the transmission channel by means of a flywheel synchronizer associated therewith, the improvement comprising a single converting circuit connected between said transmitting teleprinter and the input of said transmission channel, said converting circuit comprising first serial to parallel conversion means; first storage means for storing a number of information bits derived from said serial to parallel conversion means, said number corresponding at least to the number of bits in said code; and a second parallel to series conversion means for reducing the duration of said stop bit and for feeding arbitrary filler signals, which are insignificant as regards information, to said transmission channel in the time gaps caused by the difference between the signal frequency at said transmitting teleprinter apparatus and the signal frequency supplied to said transmission channel, thereby permitting said receiving teleprinter apparatus to normally operate at maximum rate in the start-stop mode substantially independently of said synchronizing means; said serial to parallel conversion means comprising second temporary storage means for a group of said information bits and read-in means coupled to the transmitting teleprinter for serially inserting the information bits of a group into said first temporary storage means at a first substantially constant rate;

said parallel to serial conversion means comprising third temporary storage means for a group of said information bits and readout means for serially transferring the information bit contents of said second temporary storage means into the input of said transmission channel at a second substantially constant rate;

first mechanical means for simultaneously transferring the contents of said serial to parallel conversion means to said first storage means when said transmitting teleprinter generates the stop and start codes between adjacent information groups;

second mechanical means for simultaneously transferring the contents of said first storage means to said third storage means a predetermined time after operation of said first transferring means;

said second constant rate being faster than said first constant rate.

2. The device of claim 1 wherein said converting circuit is further comprised of means for operating said first means at a first operating speed compatible with said teleprinter to serially load the output signals of said teleprinter;

said third means comprising switching means for selectively coupling said first means and said storing means for parallel transfer of their contents;

said fourth means comprising switching means for selectively coupling said second means to said storing means for parallel transfer of their contents;

means for operating said first and second switching means at times after transfer between the associated storage means has occurred;

said readout means coupled to said second means for serially coupling the contents of said second means transferring all output signals to the input of the transmission channel at a substantially uniform time interval per signal to thereby reduce the length of any otherwise prolonged pulses.

3. A synchronizing device according to claim 1, wherein a selective storage unit at the receiver is connected to said means responding at the constant time frequency, to block further transmission of the filler signal received by the receiver.

* * * * *